(12) United States Patent
Serban et al.

(10) Patent No.: US 8,383,538 B2
(45) Date of Patent: Feb. 26, 2013

(54) APPARATUS AND PROCESS FOR TREATING A HYDROCARBON STREAM

(75) Inventors: Manuela Serban, Glenview, IL (US); Kurt M. Vanden Bussche, Lake in the Hills, IL (US); Alakananda Bhattacharyya, Glen Ellyn, IL (US); Luigi Laricchia, Arlington Heights, IL (US); John P. Brady, Algonquin, IL (US); David N. Myers, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/399,285

(22) Filed: Feb. 17, 2012

(65) Prior Publication Data
US 2012/0145528 A1    Jun. 14, 2012

Related U.S. Application Data

(62) Division of application No. 12/416,065, filed on Mar. 31, 2009, now Pat. No. 8,127,938.

(51) Int. Cl.
*C10G 21/28* (2006.01)

(52) U.S. Cl. ........... 502/20; 502/22; 502/34; 502/55; 208/254 R; 210/511

(58) Field of Classification Search ........... 208/208 R, 208/236–237, 254 R; 502/20, 22, 34, 55; 210/511
See application file for complete search history.

(56) References Cited

U.S. PATENT DOCUMENTS

2006/0272934 A1* 12/2006 Beste et al. ............ 203/24
2009/0120841 A1*  5/2009 Serban et al. ......... 208/209

OTHER PUBLICATIONS

York, O.H. et al (1963). Chemical Engineering Progress, 59(6), 2-7.*
Cheng, X. et al. (2004). Fuel Processing Technology, 85, 1463-1472.*
Wang, F C-Y. et al. (2004). Journal of Separation Science, 27, 468-472.*

* cited by examiner

*Primary Examiner* — Brian McCaig
(74) *Attorney, Agent, or Firm* — Mark Goldberg

(57) ABSTRACT

One exemplary embodiment can be an apparatus for treating a hydrocarbon stream having one or more compounds with a boiling point of about 140° to about 450° C. The apparatus can include an extraction zone and a regeneration zone. The extraction zone can include at least one settler. Each settler can have a height and a length. Typically the length is greater than the height. Also, the settler can form a boot, which can be adapted to receive a feed at one end. The regeneration zone may include a regenerator for an ionic liquid. The regenerator can include a column adapted to provide a regenerated ionic liquid to the extraction zone.

13 Claims, 2 Drawing Sheets

APPARATUS AND PROCESS FOR TREATING A HYDROCARBON STREAM

CROSS-REFERENCE TO RELATED APPLICATION

This application is a Division of application Ser. No. 12/416,065 filed Mar. 31, 2009, now U.S. Pat. No. 8,127,938, the contents of which are hereby incorporated by reference in its entirety.

FIELD OF THE INVENTION

This invention generally relates to an apparatus and process for treating a hydrocarbon stream with ionic liquid, which may be regenerated.

DESCRIPTION OF THE RELATED ART

Diesel fuel can be used in a variety of vehicles; however, diesel fuel may contain sulfur-containing molecules that create pollution concerns. As a result, increasingly stringent regulations have required lower sulfur levels in diesel fuel, increasing the demand for diesel fuels having an ultra low sulfur content. One method of removing sulfur from diesel fuel can use catalytic hydrodesulfurization (may be hereinafter referred to as "HDS"). However, it can become increasingly difficult to catalytically hydrodesulfurize diesel fuels to a lower level of sulfur. Particularly, the presence of nitrogen compounds, particularly aromatic nitrogen compounds, can inhibit the removal of sulfur by HDS reactions. As a consequence, it is generally desirable to have a process to remove these nitrogen compounds.

In one instance, an ionic liquid can act as an extraction solvent for removing nitrogen compounds. Due to the high cost of ionic liquid, it is often desirable to minimize the required inventory of the ionic liquid in the manufacturing or refining unit. Moreover, the ionic liquid containing extracted nitrogen (hereinafter may be referred to as "rich ionic liquid") often requires regeneration. After regeneration, the ionic liquid (hereinafter may be referred to as "lean ionic liquid") may require drying for reuse as the extraction solvent. Using nitrogen, particularly in a continuous process, can require additional capital expenditures either to install a dedicated nitrogen plant within the refinery or have a nitrogen plant located near the refinery. In some instances, refiners may opt to provide additional nitrogen by other means, such as a tank car, which can be expensive. Consequently, a process utilizing ionic liquid that can minimize inventory and reduce capital costs would generally be beneficial.

SUMMARY OF THE INVENTION

One exemplary embodiment can be an apparatus for treating a hydrocarbon stream having one or more compounds with a boiling point of about 140° to about 450° C. The apparatus can include an extraction zone and a regeneration zone. The extraction zone can include at least one settler. Each settler can have a height and a length. Typically, the length is greater than the height. Also, the settler can form a boot, which can be adapted to receive a feed at one end. The regeneration zone may include a column for regenerating an ionic liquid. Generally, the column is adapted to provide a regenerated ionic liquid to the extraction zone.

Another exemplary embodiment can include a process for treating a hydrocarbon stream having one or more compounds with a boiling point of about 140° to about 450° C. The process can include passing the hydrocarbon stream through an extraction zone. The extraction zone can include at least one settler. Each settler may have a height and a length. Typically, the length is greater than the height. Also, each settler may receive a feed and an ionic liquid before sending the ionic liquid to a regeneration zone. Additionally, at least one nitrogen compound from the feed may migrate to the ionic liquid.

Yet another exemplary embodiment may include a process for regenerating an ionic liquid. The process can include passing an ionic liquid to a column, which may include a demister and a reboiler. Generally, the reboiler is operated at a temperature effective for regenerating the ionic liquid to a water content effective for removing one or more nitrogen compounds from a hydrocarbon stream.

The embodiments disclosed herein can provide an apparatus that can minimize the inventory of ionic liquid. In addition, the ionic liquid can be regenerated without utilizing nitrogen and optionally minimizing the amount of waste streams produced. As a consequence, the embodiments disclosed herein can provide an apparatus that reduces capital costs and improves the efficiency of utilized ionic liquids to remove nitrogen compounds from a hydrocarbon stream, such as a diesel fuel.

DEFINITIONS

As used herein, the term "rich ionic liquid" generally means an ionic liquid with one or more extracted nitrogen compounds in an amount that may require regeneration for reusing the ionic liquid.

As used herein, the term "lean ionic liquid" generally means an ionic liquid unsaturated with one or more extracted nitrogen compounds, and may contain at least one of fresh and regenerated ionic liquid that may be useable for extracting.

As depicted, process flow lines in the figures can be referred to as lines, pipes or streams. Particularly, a line or a pipe can contain one or more streams, and one or more streams can be contained by a line or a pipe.

DETAILED DESCRIPTION

Figure 1:
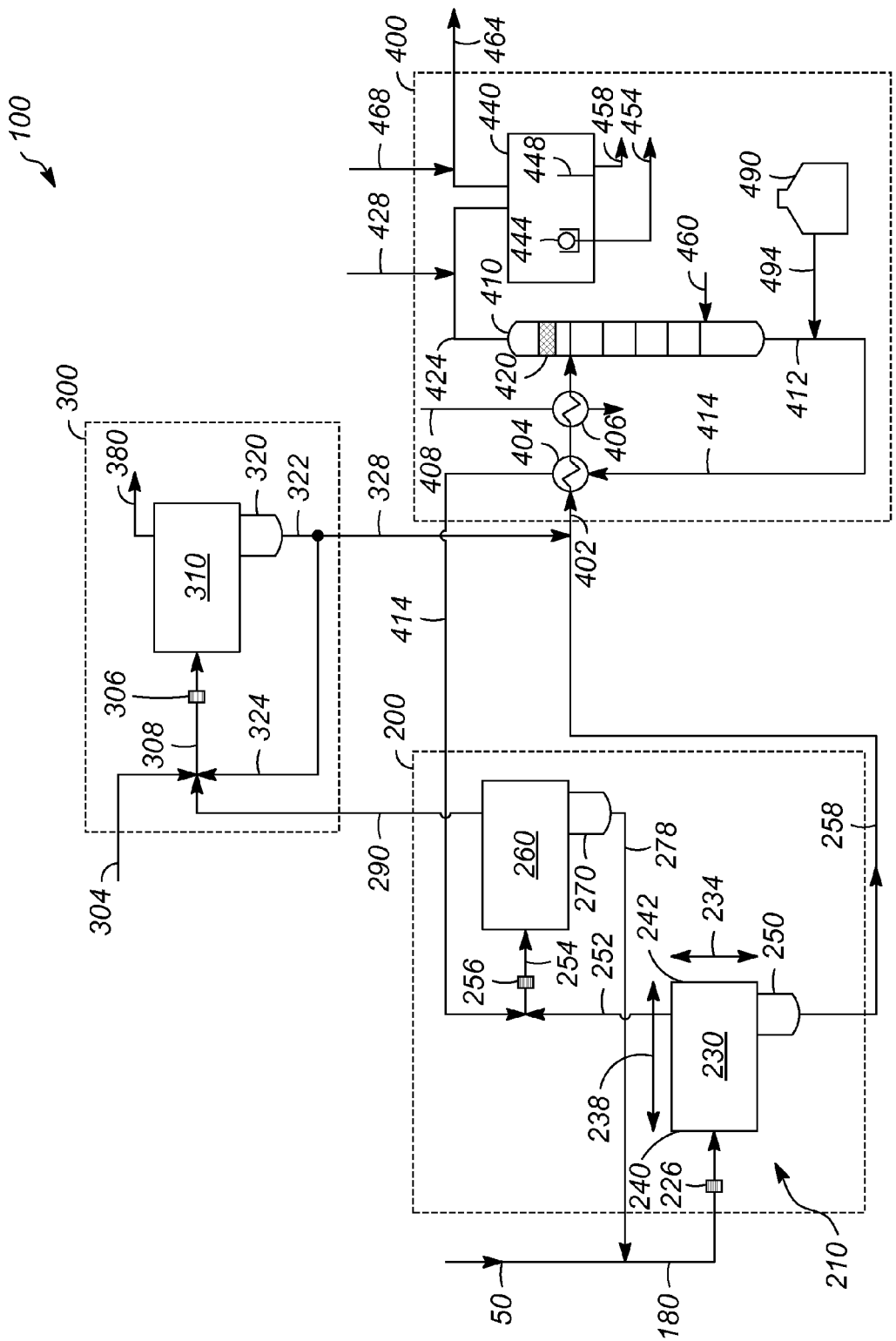
FIG. 1 is a schematic depiction of an exemplary apparatus.

Referring to FIG. 1, an exemplary apparatus 100 can include an extraction zone 200, a water wash zone 300, and a regeneration zone 400. Generally, the apparatus 100 can receive a hydrocarbon stream 50. The hydrocarbon stream 50 can include at least one of a diesel fuel, a diesel, a diesel blend, a straight-run diesel, a light cycle oil, a light coker gas oil, and a heavy light cycle oil.

Generally, the extraction zone 200 can include at least one settler or a plurality of settlers 210. Usually, the at least one settler 210 can include a first settler 230 and a second settler 260, although any suitable number of settlers can be used, such as about one to about three settlers. The settler 230 can have a height 234 and a length 238 and have an end 240 and another end 242. Generally, the length 238 can exceed the height 234. In addition, the first settler 230 can further include a boot 250 proximate to the end 242. Generally, a feed 50 can be provided proximate to the end 240, as hereinafter described.

The second settler 260 can also have a boot 270 and be the same or different than the first settler 230. Generally, the second settler 260 also has a length that exceeds its height. Moreover, the second settler 260 can also receive a feed including an effluent from the first settler 230 at an opposing end from the boot 270. Thus, the first and second settlers 230 and 260 can be orientated in series. Optionally, one or more inline static mixers 226 and 256 may be positioned in respective lines 180 and 254 before feeds enter respective settlers 230 and 260. At least part of the ionic liquid inventory may be contained in the boots 250 and 270, reducing the overall ionic liquid inventory as compared to a system without settlers 230 and 260. In addition, each settler 230 and 260 may also contain internal devices such as mesh blankets or one or more coalescing devices.

An ionic liquid is also provided to mix with the hydrocarbons in the first and second settlers 230 and 260. Typically, an ionic liquid is a nonaqueous, aprotic solvent with a low melting point, and good chemical and thermal stability. Because the melting point can be low, an ionic liquid tends to act as a solvent. Reactions can be performed and, because the liquids are made of ions rather than neutral molecules, such reactions/extractions can provide distinct reactivities/selectivities as compared to a conventional organic solvent. An ionic liquid can be acidic, basic, and neutral. Preferably, the ionic liquid is acidic with a pH below 7.

Preferred acidic ionic liquid can include butyl-methyl-imidazolium-hydrogen-sulfate (hereinafter may be abbreviated [BMIM]HSO4), butyl-methyl-imidazolium-methyl-sulfate (hereinafter may be abbreviated [BMIM]CH3SO4), or ethyl-methyl-imidazolium-hydrogen-ethyl-sulfate (hereinafter may be abbreviated [EMIM]EtSO4).

Typically, more than about 70%, by mole, nitrogen and preferably about 90%, by mole, nitrogen may be extracted or removed at or around room temperature and atmospheric pressure from the hydrocarbon feed 50. Nitrogen extraction equilibrium may be reached relatively quickly in less than about 5 minutes. Typically, the nitrogen is present in one or more nitrogen compounds. The nitrogen compound can be a hydrocarbon compound containing one or more nitrogen radicals, such as a substituted or unsubstituted carbazole, indole, and/or aniline. Due to large differences in densities between the hydrocarbon feed and the ionic liquid, the two layers tend to separate rapidly permitting decanting of the lighter, hydrocarbon phase.

Generally, each settler 230 and 260 can be operated at a pressure sufficient to maintain the hydrocarbon and ionic liquid in a liquid phase and to allow for sufficient pressure differential between the extraction zone 200 and the regeneration zone 400. Typically, the conditions in the at least one settler 210 can be a pressure of about 100 to about 1,500 kPa, preferably about 800 to about 1,500 kPa, and a temperature of about 60° to about 130° C. Generally, higher extraction temperatures can decrease the viscosity of the ionic liquid. Typically, the lean ionic liquid is fed counter-current with respect to the hydrocarbon flow. Usually, the denitrified hydrocarbon stream contains about 80 weight ppm of soluble ionic liquid after exiting the extraction zone 200.

The water wash zone 300 can include a water wash vessel 310 having a boot 320. A line 322 can communicate with the boot 320 and with the lines 324 and 328. The water wash vessel 310 can receive a stream including an effective amount of water, such as a water stream, in a line 304. The water stream can include make-up water 304 and recycled water in a line 324, as described hereinafter. In addition, the water wash zone 300 may include an inline mixer, such as a static mixer 306, in a line 308. The denitrified hydrocarbon stream in a line 290 from the extraction zone 200 can be mixed with the water streams from the lines 304 and 324 in the static mixer 306 before entering the water wash vessel 310. The recycled water in the line 324 can be about 5 to about 50%, typically about 15%, by volume, of the hydrocarbon stream in the line 290. Generally, the make-up water in the line 304 can be set to control the concentration of ionic liquid to about 2 to about 3%, by weight, in the water phase in the settler 310. The spent wash water can be routed in a line 328 by, e.g., a pressure differential, to upstream of the regeneration zone 400. A portion can be recycled in a line 324, as discussed above. Typically, a denitrified hydrocarbon product can exit in a line 380 and have about 150 to about 200 weight ppm of water and a trace amount of ionic liquid, usually no more than about 5 weight ppm. The denitrified hydrocarbon product can then be routed to an HDS unit feed surge drum by, e.g., a pressure differential. At the HDS unit, the hydrocarbon stream can be vigorously treated to produce a hydrocarbon product having a low amount of sulfur in the absence of interfering nitrogen compounds.

The regeneration zone 400 can include a first heat exchanger 404, a second heat exchanger 406, a column 410, a receiver 440, and an ionic liquid storage 490. Generally, ionic liquid from the extraction zone 200 in a line 258 is mixed with the spent wash water in a line 328 to form a combined stream in a line 402 that passes through the feed/product heat exchanger 404. Although the heat exchanger 404 utilizes a bottom stream of the column 410, any suitable stream may be used to heat the combined streams in a line 402. Afterwards, the combined stream can pass through the heat exchanger 406 that can be heated with any suitable heat source, such as a high pressure steam in a line 408. Subsequently, the combined stream can pass to the column 410.

The column 410 can incorporate a demister 420, such as a mesh demister, and provide an overhead stream in a line 424 and a bottom stream 412. In addition, the column 410 can receive a steam injection via a line 460. The ionic liquid and wash water can pass into the column with the water generally passing through the overhead line 424, which may receive a neutralization additive from a line 428. Generally, the neutralization additive can provide for pH control and help prevent corrosion. The combination can then pass to the receiver 440. The receiver 440 can separate spent water and hydrocarbon slop oil. Particularly, the collection port 444 can collect the hydrocarbon slop oil and pass the hydrocarbon slop oil through a line 454. The hydrocarbon slop oil stream can be sent to either fuel oil or finished diesel product blending if the stream has a suitable composition. In addition, the receiver 440 can release a gas stream in a line 464, which may communicate with a purge gas in a line 468. The purge gas, such as nitrogen, can be used to avoid any potential backflow from the flare header.

The water can be separated past a partition or weir 448 in the receiver 440 and be passed into a spent water line 458. The steam plus vaporized nitrogen containing hydrocarbons can exit the top of the column 410 after passing through the demister 420 to minimize liquid entrainment in the overhead system.

The rich ionic liquid sent to the regeneration zone 400 can be on a level control via a pressure difference. The rich ionic liquid can be preheated by the exchangers 404 and 406 before entering the column 410. Generally, the regeneration temperature in the column is at least about 175° C., and preferably greater than about 200° C. The heated rich ionic liquid can then be fed into any suitable tray in the column 410, such as a first tray. Superheated steam through a line 460 can enter below the bottom tray of the column 410. Steam stripping can be used to liberate the nitrogen species from the ionic liquid. Lean ionic liquid with a known amount of saturated water can exit the bottom of the column 410 via a line 412. Provision can be made for the supply of fresh ionic liquid via a line 494 from the ionic liquid storage 490. Although the ionic liquid storage 490 is depicted in the regeneration zone 400, the ionic liquid storage 490 can be outside of the zone 400.

The lean ionic liquid can be pumped from the regeneration zone 400 to the extraction zone 200. Typically, the column 410 can operate at a pressure of about 110 to about 450 kPa. Also, the temperature of the column 410 can be operated above 175° C. to maintain a low amount of water in the lean ionic liquid. Low amounts of water in the lean ionic liquid can eliminate drying the lean ionic liquid with, for example, hot nitrogen. As such, the column 410 can be operated at conditions to provide a lean ionic liquid with a water content effective for extracting one or more nitrogen-containing compounds from a hydrocarbon feed 50, such as at least about 57%, by weight, of the nitrogen-containing compounds in the hydrocarbon feed 50. Generally, the lean ionic liquid can have no more than about 5%, preferably about 3%, and optimally about 2.5%, by weight, water based on the total weight of the water and lean ionic liquid. The lean ionic liquid from the regeneration zone 400 can be pumped to the exchanger 404 for recovery of heat in the column 410. After cooling, the lean ionic liquid in the line 414 is generally about 60° to about 130° C. before entering the extraction zone 200.

Figure 2:
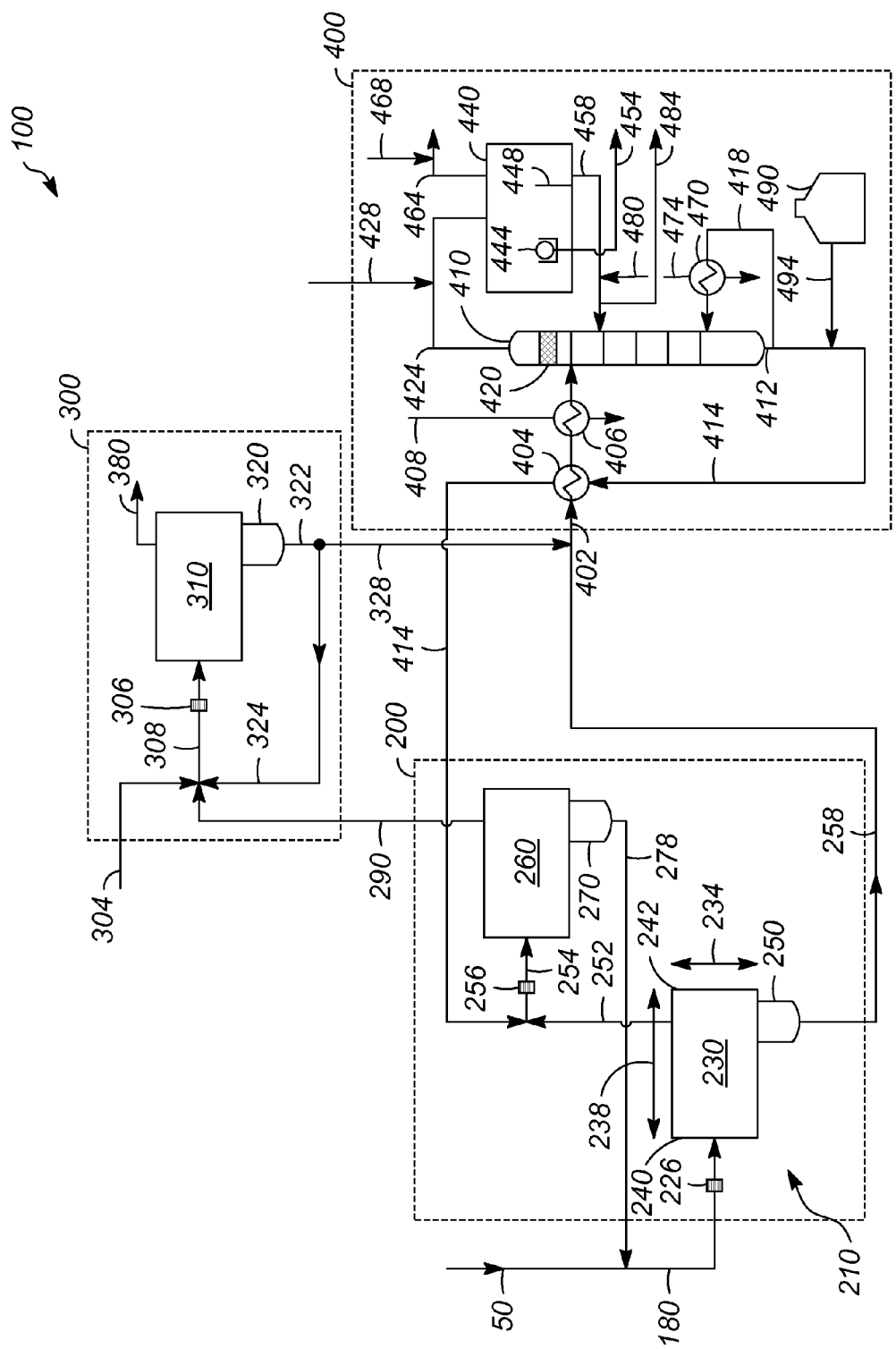
FIG. 2 is a schematic depiction of another version of the exemplary apparatus.

Referring to FIG. 2, another version of the apparatus 100 is depicted. The extraction zone 200 and the water wash zone 300 can be substantially the same as discussed above. However, the regeneration zone 400 can be different. Particularly, the regeneration zone 400 can include the exchangers 404 and 406, the column 410, the receiver 440, and the ionic liquid storage 490. However, instead of injecting steam into the column 410, a reboiler 470 can receive a portion 418 of the bottom stream 412. This portion 418 may pass through the reboiler 470, which may be a thermosyphon reboiler. The reboiler 470 can use any suitable heat source, such as high pressure steam that may be provided by a line 474. The other portion 414 of the bottom stream 412 can be passed through the exchanger 404 as described above. The column 410 can be operated at the conditions discussed above. However, it may be advantageous to operate the column 410 at a minimum pressure above atmospheric to minimize the partial pressure of water above the ionic liquid at the bottom of the column 410.

In addition, the receiver 440 can release a gas stream in a line 464, which may communicate with a purge gas in a line 468. The purge gas, such as nitrogen, can be used to avoid any potential backflow from the flare header. Moreover, the water in the line 458 may receive a stream including an effective amount of water 480 that is refluxed to the column 410. A line 484 may communicate with the reflux line 458 to purge excess water. The water injected into the column 410 can be heated to strip nitrogen from the ionic liquid. The pressure of the column 410 can be set to ensure superheated steam conditions at an operating temperature of at least about 175° C. The relatively low operating pressure of the column 410 can be achieved by setting the overhead receiver 440 at a pressure, e.g., about 140 kPa, slightly above that of the flare header pressure. The reboiler 470 can help minimize the amount of waste water generated by the regeneration zone 400. Use of the reboiler 470 can eliminate a continuous waste water stream from the column 410. Instead, waste water may be discharged intermittently. As such, waste water from the column 410 can be minimized.

ILLUSTRATIVE EMBODIMENTS

The following examples are intended to further illustrate the subject. These illustrations are not meant to limit the claims to the particular details of these examples. These examples are based on engineering calculations and actual operating experience with similar processes.

Example 1

Steaming experiments are performed at atmospheric pressure at 150°, 175°, and 200° C. with fresh ionic liquid. The fresh ionic liquid is [BMIM]HSO4. In all samples, the water amount is measured in accordance with ASTM-02(2007). Generally, the experimental conditions are at a total pressure of 1.013 bar, and conducted at temperatures of 150°, 175°, and 200° C. The steam flow through the ionic liquid is generally at 1 liter per minute. The data is depicted in Table 1 below.

TABLE 1

| Sample # | Amount of Steam L steam/g IL | Steaming Temp (° C.) | Water in Sample (wt %) |
|---|---|---|---|
| 1 (Fresh Ionic Liquid) | N/A | N/A | 0.34 |
| 2 | 0.27 | 150 | 3.75 |
| 3 | 0.43 | 150 | 5.40 |
| 4 | 0.46 | 150 | 5.90 |
| 5 | 0.69 | 150 | 5.40 |
| 6 | 0.47 | 175 | 2.21 |
| 7 | 0.48 | 200 | 1.45 |

Liter: abbreviated "L"
Ionic liquid: abbreviated "IL"
Not Applicable: abbreviated "N/A"

Generally, at 150° C., the equilibrium water uptake for Samples 2-5 ranges from 3.75 to 5.90%, by weight, water, based on the weight of the sample. At 175° C., the water uptake is 2.21%, by weight, water based on the weight of the Sample 6. At 200° C., the water uptake drops to 1.45%, by weight, water based on the weight of the Sample 7.

Subsequently, these samples are tested to determine the effect of water on the nitrogen extraction capacity. Generally, the experimental conditions include a feed of straight run diesel, light cycle oil, and light coker oil in a weight ratio of 4:3:3. This feed contains 643 weight ppm N and 193 weight ppm $H_2O$. Generally, the weight ratio of the feed to ionic liquid is about 1:0.5. Experiments are conducted at temperatures of 25° and 60° C. and a total pressure of about 101 kPa with a mixing time of 7 minutes. Results are depicted in Table 2.

TABLE 2

| Sample # | $H_2O$ in Ionic Liquid Wt. % | Nitrogen left in Diesel Blend after Extraction weight ppm | Nitrogen removed from Diesel Blend Wt. % |
|---|---|---|---|
| 1 | 0.34 | 251 | 61.0 |
| 2 | 2.26 | 263 | 59.1 |
| 3 | 5.81 | 282 | 56.1 |
| 4 | 7.50 | 295 | 54.1 |
| 5 | 10.0 | 314 | 51.2 |
| 6 | 17.4 | 357 | 44.5 |
| 7 | 33.5 | 399 | 38.0 |
| 8 | 50.0 | 425 | 33.9 |

Generally, this amount of water does not affect the extraction capacity when compared to that of a dry ionic liquid (relevant to Sample 1). Particularly, Sample 2 (relevant to the invention) removes about 59.1%, by weight, nitrogen as compared to Sample 1, which removes 61.0%, by weight, nitrogen. Conversely, Sample 3 has a water uptake of 5.81%, by weight, and a nitrogen removal of 56.1%, by weight. Consequently, it is possible to dry the ionic liquid without nitrogen purging to a water level that has substantially the same nitrogen extraction capability as fresh ionic liquid. However, if the ionic liquid regeneration is done at 175° C. or greater, a nitrogen drying step is most likely not necessary to lower water content.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for regenerating an ionic liquid comprising passing an ionic liquid through heat exchangers to a column comprising a demister and a reboiler wherein the reboiler is operated at a temperature effective for regenerating the ionic liquid to a water content effective for removing one or more nitrogen compounds from a hydrocarbon stream wherein an overhead column stream comprising spent water and hydrocarbon slop oil is sent to a receiver and wherein said overhead column stream receives a neutralization additive to provide pH control and prevent corrosion.

2. The process of claim 1, wherein the column is adapted to receive a stream comprising an effective amount of steam to strip nitrogen from the ionic liquid.

3. The process of claim 1, wherein the steam is superheated steam.

4. The process of claim 1, wherein the steam and the ionic liquid to be regenerated flow counter-current in the column.

5. The process of claim 1, wherein the column is operated at a temperature effective to have no more than 3%, by weight, water in the bottom stream based on the total weight of the water and regenerated ionic liquid.

6. The process of claim 1, wherein the temperature is at least about 175° C.

7. The process of claim 1, wherein the demister is a mesh demister.

8. The process of claim 1, wherein the reboiler is a thermosyphon reboiler.

9. The process of claim 1, wherein the spent water and hydrocarbon slop oil in the receiver are separated via a partition or weir.

10. The process of claim 1, wherein the hydrocarbon slop oil is sent to fuel oil or diesel product blending.

11. The process of claim 1, wherein the regenerated ionic liquid from the bottom of the column is supplemented with fresh ionic liquid.

12. The process of claim 1, wherein the regenerated ionic liquid is pumped through a heat exchanger for heat recovery.

13. The process of claim 1, wherein the regenerated ionic liquid temperature is about 60° to about 130° C.

* * * * *